United States Patent Office 3,491,110
Patented Jan. 20, 1970

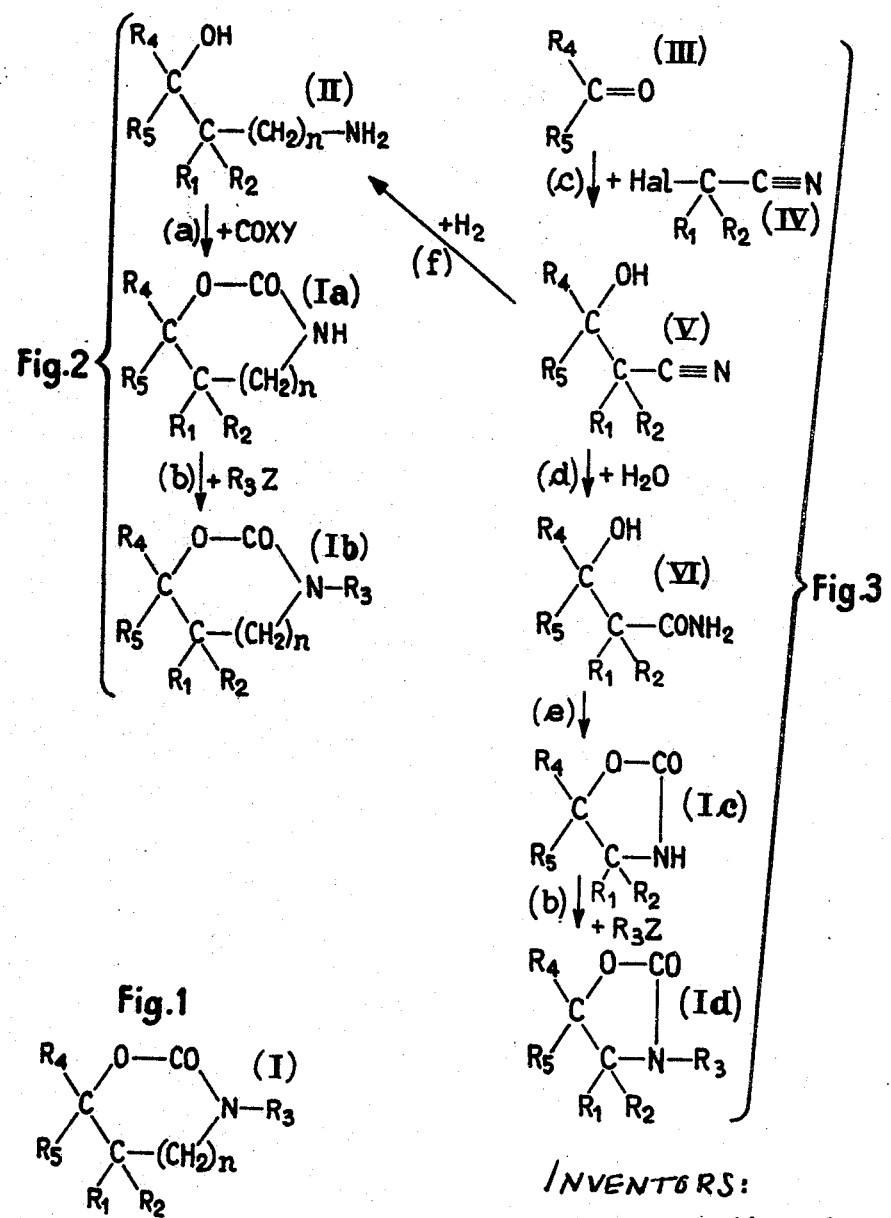

3,491,110
DERIVATIVES OF OXAZOLIDIN-2-ONE AND THEIR PROCESS OF PREPARATION
Jacques Georges Albert Eugené Maillard, Paris, and Michel Marius Jean Vincent, Bagneux, France, assignors to Laboratoires Jacques Logeais, Societe Anonyme, Issy-las-Moulineaux, France, a French body corporate
Filed July 11, 1966, Ser. No. 564,052
Claims priority, application Great Britain July 13, 1965, 29,610/65
Int. Cl. C07d 85/28, 87/08
U.S. Cl. 260—307  8 Claims

ABSTRACT OF THE DISCLOSURE

The derivatives are N-substituted cycloalkyl-5-spiro-oxazolidin-2-ones, further substituted at position 4. They are useful as therapeutic agents, especially for the treatment of heart arrhythmia.

---

The present invention relates, as novel compounds, to heterocyclic derivatives of general formula illustrated in FIG. 1 of the accompanying drawing, in which:

$n$ is 0 or 1,
$R_1$ is hydrogen or a lower alkyl group,
$R_2$ is a lower alkyl group other than methyl when $R_1$ is hydrogen, or a phenyl group,
$R_3$ is hydrogen, a lower alkyl group, a lower alkenyl group, a lower alkynyl group, a phenyl- lower alkyl group, a lower alkanoyl group or a benzoyl group, and
$R_4$ and $R_5$, together with the carbon atom to which they are attached, form a saturated 5 to 7 membered hydrocarbon ring.

Thus, according to whether $n$ is 0 or 1, these heterocyclic derivatives are oxazolidin-2-one or tetrohydro-1,3-oxazin-2-one derivatives.

It has been discovered that these derivatives exhibit useful therapeutic properties, especially for the treatment of heart arrhythmia.

For the preparation of derivatives (I) a process illustrated in FIG. 2 can be employed. According to this process, also included within the scope of the invention, in a first stage, or stage (a), a hydroxylated amine (II) is reacted with a carbonyl derivative represented in the drawing by formula COXY. This carbonyl derivative may be a carbonic acid diester, urea or urethane, the reaction being effected in the presence of sodium alkoxide or like compound; this may also be phosgene, in which case there is added to the reaction mixture a base capable of taking up the two moles of HCl that are formed, such base consisting, for example, of an excess of hydroxylated amine (II).

Cyclization stage (a) results in compounds (Ia) which constitute a sub-class of derivatives (I) wherein $R_3$ is hydrogen. In order to obtain the other sub-class (Ib) of derivatives (I) wherein $R_3$ has the meanings mentioned above other than hydrogen and which are represented by symbol $R'_3$, a second stage, or stage (b) should be involved.

In stage (b), there are reacted with compounds (Ia) an alkali metal or alkali metal hydride (generally sodium or sodium hydride) within a neutral organic solvent, followed by an alkylating, phenylalklating or acylating agent represented by symbol $R_3Z$, such as an alkyl, alkenyl, alkynyl or phenylalkyl halide or sulfate, or a lower alkanoyl or benzoyl halide, Z being a radial capable of reacting with a labile hydrogen atom.

The process just described permits the preparation of derivatives (I) both in the case where $n=0$ and where $n=1$.

However, in the case where $n=0$, a modification of the process illustrated in FIG. 3 may be used.

In the first stage, or stage (c), of this modification, an α-halonitrile (IV) wherein Hal is halogen and especially bromine is reacted with aldehyde or ketone (III). This reaction is effected advantageously in the presence of a metal such as zinc, in cutting or powder form, in a solvent such as tetrahydrofuran. It results in the production of hydroxylated nitrile (V) which is extracted with a solvent, following hydrolysis of the reaction product, and which may be isolated by distillation or crystallization.

In the second stage, or stage (d), the hydroxylated nitrile (V) is hydrolyzed into hydroxylated amide (VI) in aqueous alkaline medium, preferably in the presence of hydrogen peroxide.

In the third stage, or stage (e), the hydroxylated amide (VI) is cyclized into oxazolidin-2-one (Ic) under the action, for example, of an aqueous alkali metal hypobromite solution.

Compounds (Ic) form a sub-class of derivatives (I) wherein $n=0$ and $R_3$ is hydrogen. To result in the production of the other sub-class (Id) of derivatives (I) wherein $n=0$ and $R_3$ has the above mentioned meanings other than hydrogen, the additional stage (b) identical with stage (b) discussed hereinbefore is carried out.

It will be observed, moreover, that hydroxylated nitriles (V) may be converted (stage $f$) into hydroxylated amines (II) according to an usual hydrogenation method (catalytic hydrogenation, or hydrogenation effected by means of a metal hydride such as lithium aluminum hydride).

Thus, stage (c) may be the starting stage of the two modifications of the process shown in FIGS. 2 and 3.

The hydroxylated nitriles (V) and the hydroxylated amides (VI) are also( generally, new compounds included as such within the scope of the present invention.

The following examples illustrate the preparation of compounds (I) and their intermediates.

EXAMPLE 1

4-ethyl-cyclohexane-5-spiro-oxazolidin-2-one (I) ($n=$zero, $R_1=R_3=H$, $R_2=C_2H_5$, $R_4R_5=(CH_2)_5$):
145 g. (0.925 mole) of amine (II)

($n=0$, $R_1=H$, $R_2=C_2H_5$, $R_4R_5=(CH_2)_5$)

dissolved in 100 ml. anhydrous toluene are introduced slowly, with stirring, in 200 ml. of a 20% phosgene toluene solution, at a temperature of 10–20° C. After stirring for 2 hours and allowing to stand overnight, the precipitated amine hydrochloride is suction filtered and the filtrate is evaporated under reduced pressure. The oily residue crystallizes spontaneously or on addition of ligroin. Yield: 66%. M.P.=100–105° C.

The same product was obtained, in 84% yield, by treating a solution of 148 g. of above amine (II) in 1300 ml. of toluene, under vigorous stirring with 328 g. of aqueous potassium hydroxide solution, with 1470 ml. of a 20% phosgene toluene solution, at 10–20° C. After stirring for 3 hours, the toluene phase is washed with water and is then dried and evaporated, leaving a crystalline residue representing the desired product (I).

*Analysis.*—Calculated: C, 65.6%; H, 9.28%; N, 7.65%. Found: C, 66.0%; H, 9.46%; N, 7.65%.

The same product may be obtained according to the illustrated modification, using the following reactions:

*Stage (c).*—In a three-necked flask fitted with dropping funnel, mechanical stirrer and reflux condenser are introduced 16 g. zinc powder, 0.3 g. mercuric chloride, 10 ml. anhydrous tetrahydrofuran and a few iodine crystals. A mixture of 19.6 g. (0.2 mole) cyclohexanone (III), 35.6 g. (0.24 mole) α-bromobutyronitrile (IV) and 40 ml.

tetrahydrofuran is then added dropwise from the dropping funnel.

The reaction starts spontaneously and refluxing is maintained by controlling the rate of flow of the reagents. Boiling is continued for two hours. Hydrolysis is then effected by pouring the contents of the flask into 150 g. crushed ice to which 40 ml. of 50% diluted sulfuric acid had been added.

The hydroxylated nitrile (V) ($R_1$=H, $R_2$=$C_2H_5$, $R_4R_5$=$(CH_2)_5$) is extracted with benzene, washed with water, dried over sodium sulfate, and is then distilled under reduced pressure. B.P.=138–141° C./13 mm. Yield: 55%.

*Stage (d).*—1.67 g. (0.01 mole) of the preceding hydroxylated nitrile are dissolved in 20 ml. of methanol. To this are added 5.5 ml. of 2.5 N sodium hydroxide and 4.9 ml. of 30% hydrogen peroxide, and the mixture is allowed to rest for 3 days at room temperature. The resultant precipitate is filtered, washed with methanol, and the filtrate is evaporated to dryness under reduced pressure. The crystalline residue, after washing with ice water and drying, consists of hydroxylated amide (VI) ($R_1$=H, $R_2$=$C_2H_5$, $R_4R_5$=$(CH_2)_5$). M.P. 127–8° C. Yield: 63%.

*Stage (e).*—To a sodium hypobromite solution (prepared by adding 2.64 ml. (0.048 at) of bromine to a solution of 9.6 g. (0.024 mole) of sodium in 80 ml. of water) there are added portionwise, with stirring, 7.4 g. (0.04 mole) of the above-described hydroxylated amide, while cooling to about 0° C. Stirring is continued for a further ½ hour, the mixture is then allowed to heat up gradually and is then heated to 70–80° C. for 45 minutes. After cooling, the resulting crystals are suction filtered, washed until neutral and then dried. There is obtained derivative (I) (n=zero, $R_1$=$R_3$=H, $R_2$=$C_2H_5$, $R_4R_5$=$(CH_2)_5$). M.P.=105–6° C. Yield: 75%.

EXAMPLE 2

4-n-propyl-cyclohexane-5-spiro-oxazolidin-2-one

As described in Example 1, this compound is obtained either by cyclization of corresponding amine (II) (Stage a) or by using the modification shown in FIG. 3:

*Stage (c).*—From cyclohexanone and α-bromovaleronitrile, there is obtained the hydroxylated nitrile (V) ($R_1$=H, $R_2$=$nC_3H_7$, $R_4R_5$=$(CH_2)_5$). B.P.=133–4° C./3 mm. M.P.=46–8° C. Yield: 41%.

*Stage (d).*—This leads to the hydroxylated amide (VI) ($R_1$=H, $R_2$=$nC_3H_7$, $R_4R_5$=$(CH_2)_5$). M.P.=120–2° C. Yield: 58%.

*Stage (e).*—Leads to derivative (I) (n=zero,

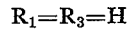

$R_1$=$R_3$=H $R_2$=$nC_3H_7$, $R_4R_5$=$(CH_2)_5$). M.P.=127–31° C. Yield: 81%.

*Analysis.*—Calculated: C, 67.0%; H, 9.71%; N, 7.10%. Found: C, 67.0%; H, 9.77%; N, 7.11%.

EXAMPLE 3

4-phenyl-cyclohexane-5-spiro-oxazolidin-2-one (I) (n=zero, $R_1$=$R_3$=H, $R_2$=$C_6H_5$, $R_4R_5$=$(CH_2)_5$) obtained from α-(1-hydroxy-cyclohexyl)benzylamine (II) (n=zero, $R_1$=H, $R_2$=$C_6H_5$, $R_4R_5$=$(CH_2)_5$). According to the process described in Example 1. M.P. 155–7° C.

*Analysis.*—Calculated: C, 72.7%; H, 7.41%; N, 6.05%. Found: C, 72.62%; H, 7.56%; N, 6.04%.

EXAMPLE 4

4,4-dimethyl-cyclohexane-5-spiro-oxazolidin-2-one (I) (n=zero, $R_1$=$R_2$=$CH_3$, $R_3$=H, $R_4R_5$=$(CH_2)_5$): This compound is obtained, as described in Example 1, either by cyclization of corresponding amine (II) or using the modification:

*Stage (c).*—From cyclohexanone and α-bromoisobutyronitrile, there is obtained hydroxylated nitrile (V) ($R_1$=$R_2$=$CH_3$, $R_4R_5$=$(CH_2)_5$). B.P. 121–2° C./2 mm. Yield: 63%. M.P. 46.5–48° C.

*Stage (d).*—Leads to the hydroxylated amide (VI) ($R_1$=$R_2$=$CH_3$, $R_4R_5$=$(CH_2)_5$). M.P. 148–50° C. Yield: 33%.

*Stage (e).*—Leads to derivative (I) (n=zero,

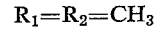

$R_1$=$R_2$=$CH_3$ $R_3$=H, $R_4R_5$=$(CH_2)_5$). M.P. 115–7° C. Yield: 76%.

*Analysis.*—Calculated: N, 7.65%. Found: N, 7.65%.

EXAMPLE 5

4-ethyl-cyclopentane-5-spiro-oxazolidin-2-one (I) (n=zero, $R_1$=$R_3$=H, $R_2$=$C_2H_5$, $R_4R_5$=$(CH_2)_4$): This compound is obtained, as described in Example 1, either by cyclization of corresponding amine (II), or using the modification:

*Stage (c).*—From cyclopentanone and α-bromobutyronitrile, there is obtained hydroxylated nitrile (V) ($R_1$=H, $R_2$=$C_2H_5$, $R_4R_5$=$(CH_2)_4$). B.P. 86–92° C./0.5 mm. Yield: 51%.

*Stage (d).*—Leads to hydroxylated amide (VI) ($R_1$=H, $R_2$=$C_2H_5$, $R_4R_5$=$(CH_2)_4$). M.P. 126–7° C. Yield: 69%.

*Stage (e).*—Leads to derivative (I) (n=zero,

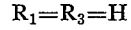

$R_1$=$R_3$=H $R_2$=$C_2H_5$, $R_4R_5$=$(CH_2)_4$). M.P. 84–5° C. Yield: 60%.

*Analysis.*—Calculated: C, 63.87%; H, 8.97%; N, 8.28%. Found: C, 63.26%; H, 8.86%; N, 8.10%.

EXAMPLE 6

4-ethyl-cycloheptane-5-spiro-oxazolidin-2-one (I) (n=zero, $R_1$=$R_3$=H, $R_2$=$C_2H_5$, $R_4R_5$=$(CH_2)_6$): This compound is obtained, as described in Example 1, either by cyclization of corresponding amine (II), or using the modification.

*Stage (c).*—From cycloheptanone and α-bromobutyronitrile, there is obtained hydroxylated nitrile (V) ($R_1$=H, $R_2$=$C_2H_5$, $R_4R_5$=$(CH_2)_6$). B.P. 110–112° C./3 mm. Yield: 68%.

*Stage (d).*—Leads to hydroxylated amide (VI) ($R_1$=H, $R_2$=$C_2H_5$, $R_4R_5$=$(CH_2)C_6$). M.P. 127–8° C. Yield: 62%.

*Stage (e).*—Leads to derivative (I) (n=zero,

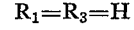

$R_1$=$R_3$=H $R_2$=$C_2H_5$, $R_4R_5$=$(CH_2)_6$). M.P. 108–9° C. Yield: 71%.

*Analysis.*—Calculated: C, 66.97%; H, 9.71%; N, 7.11%. Found: C, 67.05%; H, 9.68%; N, 7.11%.

EXAMPLE 7

3-methyl-4-ethyl-cyclohexane-5-spiro-oxazolindin-2-one (I) (n=zero, $R_1$=H, $R_2$=$C_2H_5$, $R_3$=$CH_3$, $R_4R_5$=$(CH_2)_5$)

*Stage (b).*—18.3 g. of derivative (I) (n=zero,

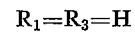

$R_1$=$R_3$=H $R_1$=$R_3$=H, $R_2$=$C_2H_5$, $R_4R_5$=$(CH_2)_5$) described in Example 1, are dissolved in 300 ml. of benzene and added to a suspension of 2.3 g. of sodium in 100 ml. of toluene. After boiling for 12 hours followed by cooling, there are added 10.35 ml. of neutral methyl sulfate and the mixture is refluxed for 2 hours. It is then allowed to stand for 3 days, the contents of the flask are then taken up into water, the organic phase is washed, dried and evaporated. The residual oil, distilled under reduced pressure, consists of derivative (I) (n=zero, $R_1$=H, $R_2$=$C_2H_5$, $R_3$=$CH_3$, $R_4R_5$=$(CH_2)_5$). B.P. 140–2° C./0.1 mm. Yield: 42%.

*Analysis.*—Calculated: C, 66.97%; H, 9.71%; N, 7.10%. Found: C, 67.06%; H, 9.71%; N, 7.11%.

EXAMPLE 8

3,4-diethyl-cyclohexane-5-spiro-oxazolindin-2-one (I) ($n$=zero, $R_1$=H, $R_2$=$R_3$=$C_2H_5$, $R_4R_5$=$(CH_2)_5$).

Stage (b).—9.1 g. of derivative (I) (n=zero, $$R_1=R_3=H$$

$R_2$=$C_2H_5$, $R_4R_5$=$(CH_2)_5$) described in Example 1 are transformed, as above, into the sodium derivative, by boiling with sodium in toluene.

The sodium derivative, isolated by evaporating the solvent to dryness, is then heated with 15 g. of ethyl bromide, in a sealed container, at 130–140° C., for 10 minutes. After cooling, the reaction mass is taken up with 50 ml. of benzene, is filtered, and concentrated under reduced pressure. The distilled residual oil represents derivative (I) ($n$=zero, $R_1$=H, $R_2$=$R_3$=$C_2H_5$, $R_4R_5$=$(CH_2)_5$).

Analysis.—Calculated: N, 6.63%. Found: N, 6.63%. B.P. 124–6° C./0.25 mm. Yield: 41%.

EXAMPLE 9

4-ethyl-3-acetyl-cyclohexane-5-spiro-oxazolidin-2-one (I) ($n$=zero, $R_1$=H, $R_2$=$C_2H_5$, $R_3$=$COCH_3$, $R_4R_5$=$(CH_2)_5$).

Stage (b).—The Sodium derivative of (I) (n=zero, $R_1$=$R_3$=H, $R_2$=$C_2H_5$, $R_4R_5$=$(CH_2)_5$) is heated with acetyl chloride in toluene, according to the technique described in Example 7.

By distillation, there is isolated derivative (I) ($n$=zero, $R_1$=H, $R_2$=$C_2H_5$, $R_3$=$PCCH_3$, $R_4R_5$=$(CH_2)_5$). B.P. 115–9° C./0.25 mm. M.P. 56–58° C. Yield: 56%.

Analysis.—Calculated: N, 6.22%; Found: N, 6.23%.

EXAMPLE 10

5-ethyl-cyclopentane-6-spiro-tetrahydro-1,3-oxazin-2-one (I) ($n$=1, $R_1$=$R_3$=H, $R_2$=$C_2H_5$, $R_4R_5$=$(CH_2)_4$). This compound is obtained from 2-(1-hydroxy-cyclopentyl)butylamine (II) ($n$=1, $R_1$=H, $R_2$=$C_2H_5$, $$R_4R_5=(CH_2)_4$$

according to the process described in Example 1 (Stage a). B.P. 176–9° C./0.3–0.5 mm. Yield: 38%.

Analysis.—Calculated: N, 7.65%. Found: N, 7.71%.

2 - (1 - hydroxy-cyclopentyl)butylamine (II) ($n$=1, $R_1$=H, $R_2$=$C_2H_5$, $R_4R_5$=$(CH_2)_4$) was itself obtained according to reaction (f) from hydroxylated nitrile (V) ($R_1$=H, $R_2$=$C_2H_5$, $R_4R_5$=$(CH_2)_4$) described in Example 5, according to the following procedure:

To a suspension of 25 g. (0.66 mol) of lithium aluminum hydride in 500 ml. anhydrous ether there are added, over 1 hour, 108 g. (0.6 mol) of hydroxylated nitrile (V) dissolved in 200 ml. of ether.

The boiling promoted by the reaction is maintained for a further 6 hours, and the mixture is then hydrolyzed by addition of 150 ml. of isopropanol and 90 ml. of saturated ClNa solution. After filtering the precipitate, the washing with ether, the filtrate is extracted with 3×120 ml. of 5 N hydrochloric acid. The dried acidic aqueous solutions are washed with ether, then made alkaline with sodium hydroxide and again extracted with ether; the ether is evaporated off, leaving an oil which is distilled under reduced pressure. B.P. 78–80° C./0.5 mm. Yield: 65%.

Analysis.—Calculated: N.W. (acadimetry), 157.2. Found: M.W. (acadimetry), 157.2.

EXAMPLE 11

5-ethyl-clclohexane-6-spiro-tetrahydro-1,3-oxazin-2-one (I) ($n$=1, $R_1$=$R_3$=H, $R_2$=$C_2H_5$, $R_4R_5$=$(CH_2)_5$): This compound is obtained from 2-(1-hydroxy-cyclohexyl)butylamine (II) ($n$=1, $R_1$=H, $R_2$=$C_2H_5$, $R_4R_5$=$(CH_2)_5$)

according to the process described in Example 1 (Stage a). M.P. 122–3° C. Yield: 39%.

Analysis.—Calculated: N, 7.12%. Found: N, 7.07%.

The 2-(1-hydroxy-cyclohexyl)butylamine (II) ($n$=1, $R_1$=H, $R_2$=$C_2H_5$, $R_4R_5$=$(CH_2)_5$) was prepared according to reaction (f) described in Example 10, from hydroxylated nitrile (V) ($R_1$=H, $R_2$=$C_2H_5$, $R_4R_5$=$(CH_2)_5$) described in Example 2. B.P. 98–101° C./0.1 mm.

Analysis.—Calculated: N, 8.18%; M.W. (acidimetry), 171.2. Found: N, 8.16%; M.W. (acidimetry), 173.6.

EXAMPLE 12

3,5-diethyl-cyclohexane-6-spiro-tetrahydro-1,3-oxazin-2-one (I) ($n$=1, $R_1$=H, $R_2$=$R_3$=$C_2H_5$, $R_4R_5$=$(CH_2)_5$): This compound is obtained, from the preceding product, according to the procedure described in Example 8 (Stage b). B.P. 109–110° C./0.03 mm. Yield: 21%.

Analysis.—Calculated: N, 6.21%. Found: N, 6.29%.

EXAMPLE 13

3-methyl-4-ethyl-cyclopentane-5-spiro-oxazolidin-2-one (I) ($n$=O, $R_1$=H, $R_2$=$C_2H_5$, $R_3$=$CH_3$, $R_4R_5$=$(CH_2)_4$) obtained from derivative (I) of Example No. 5, according to Stage (b), as described in Example No. 7. Yield: 92%. B.P. 104–5° C./0.07 mm.

Analysis.—Calculated: N, 7.65%. Found: N, 7.28%.

EXAMPLE 14

4-ethyl-3-n-propyl-cyclopentane-5-spiro-oxazolidin-2-one (I) ($n$=O, $R_1$=H, $R_2$=$C_2H_5$, $R_3$=$nC_3H_7$, $R_4R_5$=$(CH_2)_4$) obtained from derivative (I) of Example No. 5 and n-propyl bromide, according to Stage (b), such as described in Example No. 8. Yield: 77%. B.P. 112–114° C./0.07 mm.

Analysis.—Calculated: C, 68.20%; H, 10.01%; N, 6.63%. Found: C, 68.73%; H, 10.01%; N, 6.61%.

EXAMPLE 15

4-ethyl-3-isobutyl-cyclopentane-5-spiro-oxazolidin-2-one (I) ($n$=O, $R_1$=H, $R_2$=$C_2H_5$, $R_3$=$isoC_4H_9$, $R_4R_5$=$(CH_2)_4$) obtained from derivative (I) of Example No. 5 and isobutyl bromide according to Stage (b), such as described in Example No. 8. Yield: 40%. B.P. 113–114.5° C./0.07 mm.

Analysis.—Calculated: C, 69.29%; H, 10.28%; N, 6.22%. Found: 70.03%; H, 10.33%; N, 6.47%.

EXAMPLE 16

4-ethyl-3-allyl-cyclopentane-5-spiro-oxazolidin-2-one (I) ($n$=O, $R_1$=H, $R_2$=$C_2H_5$, $R_3$=$CH_2CH$=$CH_2$, $R_4R_5$=$(CH_2)_4$) obtained from derivative (I) of Example No. 5 and allyl bromide according to stage (b), such as described in Example No. 8. Yield: 64%. B.P. 106–108° C./0.04 mm.

Analysis.—Calculated: C, 68.86%; H, 9.15%; N, 6.68%. Found: C, 69.56%; H, 9.63%; N, 6.44%.

EXAMPLE 17

4-ethyl-3-benzyl-cyclopentane-5-spiro-oxazolidin-2-one (I) ($n$=O, $R_1$=H, $R_2$=$C_2H_5$, $R_3$=$CH_2C_3H_5$, $R_4R_5$=$(CH_2)_4$) obtained from derivative (I) of Example No. 5 and benzyl chloride according to Stage (b), such as described in Example No. 8. Yield: 48%. B.P. 170–172° C./0.1 mm.

Analysis.—Calculated: C, 74.34%; H, 8.16%; N, 5.40%. Found: 74.34%; H, 8.16; N, 5.40.

EXAMPLE 18

4-ethyl-3-(3-phenyl-butyl)-cyclopentane-5-spiro-oxazolidin-2-one (I) ($n$=O, $R_1$=H, $R_2$=$C_2H_5$, $R_3$=$CH_2$—$CH_2$—$CH_3$-$CHC_6H_5$, $R_4R_5$=$(CH_2)_4$) obtained from derivative (I) of Example No. 5 and 1-bromo-3-phenyl butane according to Stage (b), described in Example No. 8. Yield: 51%. B.P. 195–198° C./0.1 mm.

Analysis.—Calculated: C, 75.70%; H, 9.03%; N, 4.65%. Found: C, 76.29%; H, 9.15%; N, 4.69%.

EXAMPLE 19

4-ethyl-3-acetyl-cyclopentane-5-spiro-oxazolidin-2-one (I) ($n=0$, $R_1=H$, $R_2=C_2H_5$, $R_3=COCH_3$, $R_4R_5=(CH_2)_4$) obtained from derivative (I) of Example No. 5 and acetyl chloride, according to Stage (b), such as described in Example No. 7. Yield: 80%. M.P. 33.5°–34° C.

Analysis.—Calculated: C, 62.53%; H, 8.11%; N, 6.64%. Found: C, 62.57%; H, 8.24%; N, 6.80%.

EXAMPLE 20

4-ethyl-3-n-butyl-cyclohexane-5-spiro-oxazolidin-2-one (I) ($n=0$, $R_1=H$, $R_2=C_2H_5$, $R_3=nC_4H_9$, $R_4R_5=(CH_2)_5$) obtained from derivative (I) of Example No. 1 and n-butyl bromide, according to Stage (b), as described in Example No. 8. Yield: 74%. B.P. 120–123° C./0.05 mm.

Analysis.—Calculated: C, 70.24%; H, 10.52%; N, 5.85%. Found: C, 69.90%; H, 10.52%; N, 5.84%.

EXAMPLE 21

4-ethyl-3-isobutyl-cyclohexane-5-spiro-oxazolidin-2-one (I) ($n=0$, $R_1=H$, $R_2=C_2H_5$, $R_3=isoC_4H_9$, $R_4R_5=(CH_2)_5$) obtained from derivative (I) of Example No. 1 and isobutyl bromide, according to Stage (b), as described in Example No. 8. B.P. 138–139.5° C./0.1 mm.

Analysis.—Calculated: C, 70.24%; H, 10.52%; N, 5.85%. Found: C, 69.86%; H, 10.60%; N, 5.84%.

EXAMPLE 22

4-ethyl-3-n-pentyl-cyclohexane-5-spiro-oxazolidin-2-one (I) ($n=0$, $R_1=H$, $R_2=C_2H_5$, $R_3=n-C_5H_{11}$, $R_4R_5=(CH_2)_5$) obtained from derivative (I) of Example No. 1 and n-pentyl bromide, according to Stage (b), as described in Example No. 8. Yield: 81%. B.P. 140° C./0.08 mm.

Analysis.—Calculated: C, 71.09%; H, 10.74; N, 5.53%. Found: C, 70.50%, H, 10.71%; N, 5.60%.

EXAMPLE 23

4-ethyl-3-allyl-cyclohexane-5-spiro-oxazolidin-2-one (I) ($n=0$, $R_1=H$, $R_2=C_2H_5$, $R_3=CH_2CH=CH_2$, $R_4R_5=(CH_2)_5$) obtained from derivative (I) of Example No. 1 and allyl bromide, according to Stage (b), as described in Example No. 8. Yield: 81%. B.P. 123.5–124.5° C./0.08 mm.

Analysis.—Calculated: C, 69.91%; H, 9.48%; N, 6.27%. Found: C, 69.64%; H, 9.53%; N, 6.27%.

EXAMPLE 24

4-ethyl-3-benzyl-cyclohexane-5-spiro-oxazolidin-2-one (I) ($n=0$, $R_1=H$, $R_2=C_2H_5$, $R_3=CH_2C_6H_5$, $R_4R_5=(CH_2)_5$) obtained from derivative (I) of Example No. 1 and benzyl chloride, according to Stage (b), as described in Example No. 8. Yield: 69%. M.P. 88° C.

Analysis.—Calculated: N, 5.12%. Found: N, 5.12%.

EXAMPLE 25

4-n-butyl-cyclohexane-5-spiro-oxazolidin-2-one

Stage (a).—To a cooled solution of 15.7 g. of the hydrochloride of amine (II) ($n=0$, $R_1=H$, $R_2=nC_4H_9$, $R_5=(CH_2)_5$) in 215 ml. of water, there are added 26.9 g. of potassium hydroxide pellets and 150 ml. of toluene. The mixture is vigorously stirred and treated with 108 ml. of 20% phosgene toluene solution, slowly, the temperature being maintained at +10° C. The decanted toluene phase is washed with water, dried and evaporated. The crystalline residue is purified by recrystallization. Yield: 78%. M.P. 95–97° C.

Analysis.—Calculated: C, 68.20%; H, 10.01%; N, 6.63%. Found: C, 68.12%; H, 10.17%; N, 6.56%.

The same product may be obtained according to the modification illustrated, by means of the following reactions:

Stage (b).—The reaction between cyclohexanone and the α-bromocaproic nitrile in tetrahydrofuran, such as described for a lower homolog in Example No. 2, leads to hydroxylated nitrile (V) ($R_1=H$, $R_2=nC_4H_9$, $R_4R_5=(CH_2)_5$). B.P. 117–118° C./0.1 mm. M.P. 40° C.

Stage (c).—The preceding hydroxylated nitrile is transformed, according to the process described in Example 2, into hydroxylated amide (VI) ($R_1=H$, $R_2=nC_4H_9$, $R_4R_5=(CH_2)_5$). M.P. 108–110° C.

Stage (d).—The preceding hydroxylated amide is transformed, according to the process described in Example No. 2, into derivative (I) ($n=0$, $R_1=H$, $R_2=nC_4H_9$, $R_3=H$, $R_4R_5=(CH_2)_5$). M.P. 95–97° C.

EXAMPLE 26

4-isopentyl-cyclohexane-5-spiro-oxazolidin-2-one (I) ($n=0$, $R_1=H$, $R_2=iC_5H_{11}$, $R_3=H$, $R_4R_5=(CH_2)_5$) obtained from amine (II) ($n=0$, $R_1=H$, $R_2=iC_5H_{11}$, $R_4R_5=(CH_2)_5$) and phosgene, according to Stage (a), as described in Example No. 25. M.P. 108–110° C.

Analysis.—Calculated: C, 69.29%; H, 10.28%; N, 6.22%. Found: C, 69.16%; H, 10.32%; N, 6.18%.

EXAMPLE 27

3-ethyl-4-n-butyl-cyclohexane-5-spiro-oxazolidin-2-one (I) ($n=0$, $R_1=H$, $R_2=nC_4H_9$, $R_3=C_2H_5$, $R_4R_5=(CH_2)_5$) obtained from derivative (I) of Example No. 25 and ethyl bromide, according to Stage (b), as described in Example No. 8. Yield: 63%. B.P. 124–128° C./0.07 mm.

Analysis.—Calculated: C, 70.24%; H, 10.52%; N, 5.85%. Found: C, 70.07%; H, 10.60%; N, 5.86%.

EXAMPLE 28

3-ethyl-4-isopentyl-cyclohexane-5-spiro-oxazolidin-2-one (I) ($n=0$, $R_1=H$, $R_2=iC_5H_{11}$, $R_3=C_2H_5$, $R_4R_5=(CH_2)_5$) obtained from derivative (I) of Example No. 26 and isopentyl bromide, according to Stage (b), as described in Example No. 8. Yield: 56%. B.P. 129–131° C./0.07 mm.

Analysis.—Calculated: C, 71.09%; H, 10.74%; N, 5.53%. Found: C, 71.07%; H, 10.82%; N, 5.53%.

EXAMPLE 29

3,5-diethyl-cyclopentane-6-spiro-tetrahydro-1,3-oxazin-2-one (I) ($n=1$, $R_1=H$, $R_2=R_3=C_2H_5$, $R_4R_5=(CH_2)_4$) obtained from derivative (I) of Example No. 10, according to Stage (b), as described in Example No. 8. Yield: 66%. B.P. 119–120° C./0.05 mm.

Analysis.—Calculated: C, 68.20%; H, 10.01; N, 6.63%. Found: C, 69.24%; H, 10.11%; N, 6.34%.

EXAMPLE 30

5-ethyl-3-n-butyl-cyclopentane-6-spiro-tetrahydro-1,3-oxazin-2-one (I) ($n=1$, $R_1=H$, $R_2=C_2H_5$, $R_3=nC_4H_9$, $R_4R_5=(CH_2)_4$) obtained from derivative (I) of Example No. 10 and n-butyl bromide, according to Stage (b), as described in Example No. 8. Yield: 77%: B.P. 132–134° C./0.04 mm.

Analysis.—Calculated: C, 70.24%; H, 10.52%; N, 5.85%. Found: C, 71.23%; H, 11.05%; N, 5:53%.

EXAMPLE 31

5-ethyl-3-propargyl-cyclopentane-6-spiro-tetrahydro-1,3-oxazin-2-one (I) ($n=1$, $R_1=H$, $R_2=C_2H_5$, $R_3=CH_2C\equiv CH$, $R_4R_5=(CH_2)_4$) obtained from derivative (I) of Example No. 10 and propargyl bromide, according to Stage ($b$), as described in Example No. 8. Yield: 47%. B.P.=145–147° C./0.2 mm.

*Analysis.*—Calculated: C, 70.55%; H, 8.65%; N, 6.33%. Found: C, 70.14%; H, 8.68%; N, 6.17%.

EXAMPLE 32

5-ethyl-3-phenethyl-cyclopentane-6-spiro-tetrahydro-1,3-oxazin-2-one (I) ($n=1$, $R_1=H$, $R_2=C_2H_5$, $R_3=CH_2CH_2C_6H_5$, $R_4R_5=(CH_2)_4$) obtained from derivative (I) of Example No. 10 and phenethyl bromide, according to Stage ($b$), as described in Example No. 8 undistilled oil.

*Analysis.*—Calculated: C, 75.22%; H, 8.76%; N, 4.87%. Found: C, 76.38%; H, 9.24%; N, 4.43%.

EXAMPLE 33

5-ethyl-3-benzoyl-cyclopentane-6-spiro-tetrahydro-1,3-oxazin-2-one (I) ($n=1$, $R_1=H$, $R_2=C_2H_5$, $R_3=COC_6H_5$, $R_4R_5=(CH_2)_4$)

obtained from derivative (I) of Example No. 10 and benzoyl bromide, according to stage ($b$), such as described in Example No. 7. Yield: 27%. M.P. 84–85° C.

*Analysis.*—Calculated: C, 71.05%; H, 7.36%; N, 4.87%. Found: C, 71.08%; H, 7.40%; N, 4.87%.

EXAMPLE 34

5-ethyl-3-isopropyl-cyclohexane-6-spiro-tetrahydro-1,3-oxazin-2-one (I) ($n=1$, $R_1=H$, $R_2=C_2H_5$, $R_3=iC_3H_7$, $R_4R_5=(CH_2)_5$)

obtained from derivative (I) of Example No. 8. B.P. 154–155° C./0.5 mm.

*Analysis.*—Calculated: C, 70.24%; H, 10.52%; N, 5.85%. Found: C, 68.73%; H, 10.73%; N, 5.80%.

EXAMPLE 35

5-ethyl-3-propargyl-cyclohexane-6-spiro-tetrahydro-1,3-oxazin-2-one (I) ($n=1$, $R_1=H$, $R_2=C_2H_5$, $R_3=CH_2C\equiv CH$, $R_4R_5=(CH_2)_5$) obtained from derivative (I) of Example No. 13 and propargyl bromide, according to Stage ($b$), as described in Example No. 10. M.P. 97–100° C.

*Analysis.*—Calculated: C, 71.45%; H, 8.99%; N, 5.95%. Found: 71.74%; H, 9.12%; N, 5.84%.

EXAMPLE 36

5-ethyl-3-phenethyl-cyclohexane-6-spiro-tetrahydro-1,3-oxazin-2-one (I) ($n=1$, $R_1=H$, $R_2=C_2H_5$, $R_3=CH_2CH_2C_6H_5$, $R_4R_5=(CH_2)_5$) obtained from derivative (I) of Example No. 11 and phenethyl bromide, according to Stage ($b$), as described in Example No. 8. B.P. 182–185° C./0.08 mm.

*Analysis.*—Calculated: C, 75.70%; H, 9.03%; N, 4.65%. Found: C, 75.80%; H, 9.07%; N, 4.38%.

EXAMPLE 37

5-ethyl-3-(3-phenyl-butyl)cyclohexane-6-spiro-tetrahydro-1,3-oxazin-2-one (I)

($n=1$, $R_1=H$, $R_2=C_2H_5$, $R_3=CH_2-CH_2-\underset{\underset{CH_3}{|}}{CH}-C_6H_5$, $R_4R_5=(CH_2)_5$)

obtained from derivative (I) of Example No. 11 and 1-bromo-3-phenyl butane, according to Stage ($b$), as described in Example No. 8. B.P. 180–183° C./0.05 mm.

*Analysis.*—Calculated: C, 76.55%; H, 9.48%; N, 4.25%. Found: C, 76.63%; H, 9.30%; N, 4.05%.

EXAMPLE 38

5-ethyl-3-benzoyl-cyclohexane-6-spiro-tetrahydro-1,3-oxazin-2-one (I) ($n=1$, $R_1=H$, $R_2=C_2H_5$, $R_3=COC_6H_5$, $R_4R_5=(CH_2)_5$)

obtained from derivative (I) of Example No. 11 and benzoyl chloride, according to Stage ($b$), as described in Example No. 7. M.P. 104–106° C.

*Analysis.*—Calculated: C, 71.73%; H, 7.69%; N, 4.65%. Found: C, 71.82%; H, 7.78%; N, 4.60%.

Compounds (I) were submitted to pharmacological tests for the purpose of determining their toxicity and pharmacological properties.

The toxicity tests were carried out in mice, the products being injected intraperitoneally, in aqueous solution or suspension.

The therapeutic properties were demonstrated by means of the following test:

The intravenous injection in a rabbit anesthetized with urethane of a solution containing 2 mg./kg. of barium chloride and 100 mg./kg. of ouabain causes, in all cases, a ventricular fibrillation which is apparent from the recording of the contractions of the heart and from the electrocardiogram, in accordance with conventional methods.

Prior treatment of a rabbit with a derivative (I) administered by the intraperitoneal route or the intraduodenal route protects the animal from the release of ventricular fibrillation under the simultaneous influence of barium chloride and ouabain.

The data resulting from the pharmacological experiments are set forth in tabular form in the accompanying table wherein:

Derivatives (I) are identified by the number of the example describing the preparation thereof, The toxicity (by the intraperitoneal route) is expressed by the minimum dosage which is lethal in all cases (MLD) and the maximum tolerated dosage (MTD), The anti-fibrillation action, in rabbit given subsequently the barium chloride-ouabain injection, is expressed by the percent animals protected against heart fibrillation, at the indicated dosage.

In the last column of the table is mentioned the further activity noted in the case of some of derivatives (I), viz:

Central nervous system depression, evaluated by the decreased spontaneous motility in the treated mice, with respect to reference animals.

TABLE

| Derivative (I) | Toxicity (I.P. route) | | Protection against fibrillation with BaCl₂ and ouabain | | Further action |
|---|---|---|---|---|---|
| | MLD | MTD | Dosage, mg./kg. | Percent protected animals | |
| Example No. 4 | 60 | 30 | 15 (IP) | 50 | |
| Example No. 1 | 1,000 | 250 | 60 (IM) / 60 (IP) | 100 / 71 | Depression of C.N.S. |
| Example No. 11 | 500 | 125 | 60 (IP) | 75 | |
| Example No. 7 | 1,000 | 60 | 30 (IP) | 75 | |
| Example No. 6 | 1,000 | 250 | 60 (IP) | 75 | |
| Example No. 5 | 500 | 250 | 125 (IP) / 120 (ID) | 100 / 75 | |
| Example No. 8 | >500 | 250 | 30 (IP) / 60 (ID) | 100 / 100 | Depression of C.N.S. |
| Example No. 9 | 1,000 | 500 | 250 (IP) / 500 (ID) | 100 / 100 | |
| Example No. 12 | >250 | 60 | 30 (IP) / 60 (ID) | 100 / 100 | |
| Example No. 10 | 500 | 125 | 60 (IP) | 50 | |
| Example No. 24 | >1,000 | | 40 (IP) | 100 | |

The derivatives (I) may be formulated as therapeutic compositions with the usual excipients and vehicles. When administered to humans, in the form of tablets, capsules or the like (in the case of liquid products), or in suppository form, at dosages of 0.100 to 1 g. per administered unit, they have an anti-arhythmic activity clinically useful in various disorders of the cardiac rhythm (ventricular tachycardia, extrasystoles, flutter).

In particular, derivative (I) described in Example No. 8 was administered to patients exhibiting cardiac ryhthm disorders that had been improved transiently, several times in succession, by the usual therapeutics (electric shock, anti-fibrillation materials). Treatment with 2–6 capsules daily (each capsule containing 0.500 g. of material) prevented the expected recurrence of ventricular tachycardia or of extrasystoles.

Having now described our invention what we claim as new and desire to secure by Letters Patent is:

In the claims:

1. A compound of the formula:

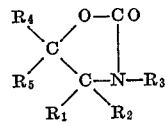

(I)

wherein:

[n is selected from zero and 1], $R_1$ is a member selected from the group consisting of hydrogen and lower alkyl, $R_2$ is a member selected from the group consisting of lower alkyl, other than methyl when $R_1$ is hydrogen, and phenyl, $R_3$ is a member selected from the group consisting of lower alkyl, lower alkenyl, lower alkynyl, phenyl-lower alkyl, lower alkanoyl and benzoyl, and $R_4$ and $R_5$, together with the carbon atom to which they are attached, form a saturated 5 to 7 membered hydrocarbon ring.

2. 4-ethyl-3-allyl cyclohexane-5-spiro-oxazolidin-2-one.
3. 4-ethyl-3-N-butyl-cyclohexane-5-spiro-oxazolidin-2-one.
4. 3,4-diethyl-cyclohexane-5-spiro-oxazolidin-2-one.
5. 4-ethyl-3-acetyl-cyclopentane-5-spiro-oxazolidin-2-one.
6. Process for the preparation of a compound of the formula:

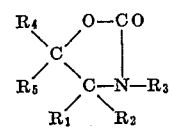

(I)

wherein:

$R_1$ is a member selected from the group consisting of hydrogen and lower alkyl, $R_2$ is a member selected from the group consisting of lower alkyl, other than methyl when $R_1$ is hydrogen, and phenyl, $R_3$ is a member selected from the group consisting of lower alkyl, lower alkenyl, lower alkynyl, phenyl-lower alkyl, lower alkanoyl and benzoyl, and $R_4$ and $R_5$, together with the carbon atom to which they are attached, form a saturated 5 to 7 membered hydrocarbon ring, said process comprising treating with an aqueous alkali metal hypobromite solution an amide of formula

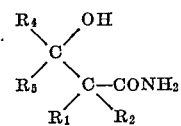

in which $R_1$, $R_2$, $R_4$ and $R_5$ are as previously defined, so as to cyclize this amide into the corresponding N-unsubstituted oxazolidin-2-one and reacting the latter with a compound of formula $R_3Z$, wherein $R_3$ is as previously defined and Z is a radical capable of reacting with a labile hydrogen atom.

7. Process as claimed in claim 6, wherein said N-unsubstituted oxazolidin-2-one is first treated with a reagent selected from alkali metals and alkali metal hydrides within a neutral organic solvent, and is then treated with the compound of formula $R_3Z$.

8. Process as claimed in claim 6, wherein Z is a halide or sulfate radical.

References Cited

UNITED STATES PATENTS

| | | | |
|---|---|---|---|
| 3,193,559 | 7/1965 | Regnier et al. | 260—307.3 |
| 2,041,513 | 5/1936 | Raeck | 260—307.3 |
| 3,157,668 | 11/1969 | Little et al. | 260—307.3 |

FOREIGN PATENTS

| | | |
|---|---|---|
| 1,134,381 | 8/1962 | Germany. |

ALEX MAZEL, Primary Examiner

B. I. DENTZ, Assistant Examiner

U.S. Cl. X.R.

260—244; 424—248, 272